United States Patent
Wang et al.

(10) Patent No.: US 10,002,128 B2
(45) Date of Patent: Jun. 19, 2018

(54) SYSTEM FOR TOKENIZING TEXT IN LANGUAGES WITHOUT INTER-WORD SEPARATION

(71) Applicant: Samsung Electronics Co., Ltd., Suwon-si, Gyeonggi-do (KR)

(72) Inventors: Yifu Wang, Pittsburgh, PA (US); Eric Glover, Palo Alto, CA (US); Chen Zhang, Mountain View, CA (US); Zhaohui Chen, Saratoga, CA (US); Xueying Dai, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/927,274

(22) Filed: Oct. 29, 2015

(65) Prior Publication Data

US 2017/0068655 A1    Mar. 9, 2017

Related U.S. Application Data

(60) Provisional application No. 62/216,329, filed on Sep. 9, 2015.

(51) Int. Cl.
*G06F 17/27* (2006.01)
*G06F 17/28* (2006.01)

(52) U.S. Cl.
CPC ........ *G06F 17/277* (2013.01); *G06F 17/2775* (2013.01); *G06F 17/2863* (2013.01)

(58) Field of Classification Search
CPC .. G06F 17/2785; G06F 17/271; G06F 17/272; G10L 15/1815

USPC .................................................................. 704/9
See application file for complete search history.

(56) References Cited

U.S. PATENT DOCUMENTS

2005/0210003 A1    9/2005  Tsay et al.
2006/0253438 A1*  11/2006  Ren .................. G06F 17/30616
2012/0278339 A1   11/2012  Wang
(Continued)

FOREIGN PATENT DOCUMENTS

WO    WO-2012071169 A2    5/2012

OTHER PUBLICATIONS

"NLPchina/ansj_seg". GitHub. N.p., 2016. Web. Jul. 31, 2015.
(Continued)

*Primary Examiner* — Jakieda Jackson
(74) *Attorney, Agent, or Firm* — Jefferson IP Law, LLP

(57) ABSTRACT

A computerized system for transforming an input string includes a dictionary with tokens and associated scores. A chart parser generates a chart parse of the input string by, for each position within the input string, (i) identifying a string of at least one consecutive character in the input string that begins at that position and matches one of the tokens and (ii) unless the identified string is a single character matching the start character for another entry in the chart parse, creating an entry corresponding to the identified string. A partition selection module determines a selected partition of the input string. The selected partition includes an array of tokens selected from the chart parse such that their concatenation matches the input string. The selected partition is a minimum score partition, where the score is based on a sum of the tokens' associated scores from the dictionary.

24 Claims, 9 Drawing Sheets

(56) References Cited

U.S. PATENT DOCUMENTS

| | | | |
|---|---|---|---|
| 2014/0006423 A1* | 1/2014 | Melnychenko | G06F 17/3053 |
| | | | 707/749 |
| 2014/0108005 A1* | 4/2014 | Kassis | G06F 17/271 |
| | | | 704/9 |
| 2014/0229474 A1 | 8/2014 | Or et al. | |
| 2015/0026153 A1 | 1/2015 | Gupta et al. | |
| 2016/0012020 A1* | 1/2016 | George | G06F 17/2785 |
| | | | 704/9 |
| 2016/0062969 A1* | 3/2016 | Mengle | G06F 17/274 |
| | | | 704/9 |

OTHER PUBLICATIONS

Foo, S.& Li, H., "Chinese Word Segmentation and Its Effect on Information Retrieval", *Information Processing & Management*, 40, 161-190.
JCSEG Source Git Hosting China, One. jcseg Chinese word breaker, Google Code. Accessed Jul. 31, 2015.
"The Stanford Natural Language Processing Group". Nlp.stanford.edu. N.p., 2016. Web. Jul. 31, 2015.
Pak-kwong Wong and Chorkin Chan. 1996. Chinese word segmentation based on maximum matching and word binding force. In Proceedings of the 16th conference on Computational linguistics—vol. 1 (COLING '96), vol. 1. Association for Computational Linguistics, Stroudsburg, PA, USA, 200-203.
International Search Report and Written Opinion for PCT Application No. PCT/IB2016/055405, dated Dec. 13, 2016, 7 pages.

\* cited by examiner

SYSTEM FOR TOKENIZING TEXT IN LANGUAGES WITHOUT INTER-WORD SEPARATION

CROSS-REFERENCE TO RELATED APPLICATIONS

This application claims the benefit of U.S. Provisional Application No. 62/216,329, filed on Sep. 9, 2015, the entire disclosure of which is incorporated herein by reference.

FIELD

The present disclosure relates to tokenizing a string of text and more particularly to tokenizing text in languages without inter-word separators.

BACKGROUND

A computerized search system generally receives a query from a user and constructs some type of internal "search query" against indexed content. The process of converting the user's input query to an internal search query traditionally involves a process of "tokenization" where the user's query is split into "chunks" or "tokens." For most languages, including English, Spanish, and French, tokenization is done based on spaces or punctuation.

As an example, the following are example tokenizations of English phrases, with each token in a separate string delimited by quotation marks:
"the new york yankees"→["the", "new", "york", "yankees"]
"what is a chart-parse?"→["what", "is", "a", "chart", "parse"]

Some languages, such as Chinese, Japanese, Korean, and Vietnamese, do not have divisions between words. For example, the query "where is the nearest zoo?" might be written in Chinese as "最近的动物 园在哪里." Tokenization problems arise because, unlike in English, it is not obvious where the boundaries between tokens are.

"动" by itself is a valid Chinese word that means "move," and "物" by itself means "thing." When put together, they mean "animal." Likewise, "园" by itself means "garden," and when combined with the characters for animal, results in "动物园," meaning "zoo." Simply choosing a token as soon as a valid word is encountered can result in an improper understanding of the meaning of a phrase. For example, performing a text search on "move," "thing," and "garden" is very different from searching for "zoo." A document about "flower garden," "花园," should not have a strong relevance match to "zoo," "动物园."

Individually, "东" means "east" and "西" means "west." The combined characters "东西" means "objects," which has nothing to do with directions. This highlights the importance of proper tokenization. The tokenization challenge arises when making sense of user queries as well as content. Another example is "东西."

There are currently several methods for tokenizing Chinese (or other Asian languages). One method, STANFORD NATURAL LANGUAGE PROCESSING software, relies on machine learning rules called conditional random field (CRF) to guess when to segment text. Other methods are highly dictionary-based, such as JCSEG (JAVA OPEN SOURCE CHINESE WORD BREAKER) software and ANSJ_SEG software from NPL CHINA. Existing dictionary-based methods rely on having a good dictionary as well as being able to determine when it is appropriate to break down a word into smaller valid words as described above.

Current methods are usually too slow, or not very effective, or often both. Effectiveness may be measured by either human validation of tokenization or by applying a relevance measure such as Discounted Cumulative Gain (DCG) to a system that utilizes the tokenizer for text search and or processing. Given a large block of text, such as an application description, tokenization may be necessary to build a search index, and many historic approaches scale badly as the length of the text block increases. Especially when trying to parse a huge number of blocks of text, any savings in time and computational resources over prior art systems and methods would be desirable.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computerized system for transforming an input text string includes a dictionary data store, a chart parser, and a partition selection module. The input text string is an ordered set of characters. The dictionary data store is configured to store a plurality of tokens. Each token is associated with a score. Each token is a string of one or more characters. The chart parser is configured to generate a chart parse of the input text string. The chart parse includes a plurality of entries. Each entry includes (i) an indication of a start character of the entry within the input text string and (ii) an indication of an end character of the entry within the input text string. The chart parser is configured to, for each position within the input text string, (i) identify a string of at least one consecutive character in the input text string that begins at that position and matches one of the plurality of tokens and (ii) unless the identified string is a single character matching the start character for another entry in the chart parse, create an entry corresponding to the identified string. The partition selection module is configured to determine a selected partition of the input text string based on the entries of the chart parse. The selected partition includes an array of tokens such that a concatenation of the array of tokens matches the ordered set of characters of the input text string. Each of the array of tokens is selected from the chart parse. A score of the selected partition is based on a sum of, for each token of the array of tokens, the score specified by the dictionary data store. The selected partition is a minimum score partition.

In other features, the chart parser is configured to, for each position within the input text string, (i) identify a string of consecutive characters in the input text string that ends at that position and matches one of the plurality of tokens and (ii) unless the identified string is a single character matching the end character for another entry in the chart parse, create an entry corresponding to the identified string. In other features, for each entry, the indication of the start character of the entry within the input text string and the indication of the end character of the entry within the input text string are specified as one of (i) a numerical start position within the input text string and a numerical end position within the input text string, (ii) the numerical start position within the input text string and a numerical length, and (iii) the numerical length and the numerical end position within the input text string.

In other features, the system includes a hash map configured to store hash values of a set of tokens from the dictionary data store. The chart parser is configured to calculate a hash value of a candidate token from the input text string. Presence of the calculated hash value in the hash map indicates that the candidate token matches one of the set of tokens. In other features, the set of tokens is a proper subset of the plurality of tokens in the dictionary data store. The set of tokens is selected from the plurality of tokens based on a domain of the input text string. In other features, the scores associated with the set of tokens are dependent on the domain.

In other features, the chart parser is configured to generate a second chart parse by, for each position within the input text string, (i) identify a string of consecutive characters in the input text string that ends at that position and matches one of the plurality of tokens and (ii) unless the identified string is a single character matching the end character for another entry in the second chart parse, create an entry in the second chart parse corresponding to the identified string. In other features, the partition selection module is configured to determine a first partition of the input text string having a first score using the entries of the chart parse, determine a second partition of the input text string having a second score using the entries of the second chart parse, designate the first partition as the selected partition in response to the first score being lower than the second score, and designate the second partition as the selected partition in response to the second score being lower than the first score.

In other features, the score of the selected partition is equal to the sum of, for each token of the array of tokens, the score specified by the dictionary data store. In other features, for each token in the dictionary data store, the associated score is based on frequency of occurrence of the token. In other features, for each token in the dictionary data store, the associated score is calculated by taking an inverse logarithm of the frequency of occurrence of the token.

A search system includes the above system. The input text string is based on a search query from a user device. A data store stores application state records. A set generation module is configured to, in response to the set of tokens, select records from the data store to form a consideration set of records. A set processing module is configured to assign a score to each record of the consideration set of records. A results generation module is configured to respond to the user device with a subset of the consideration set of records. The subset is selected based on the assigned scores. The subset identifies application states of applications that are relevant to the search query.

A search system includes the above system. A data store stores application state records. An intake module is configured to generate the application state records from source data. The source data includes a text string used as the input text string. A set generation module is configured to, in response to receiving a search query from a user device, select records from the data store to form a consideration set of records. A set processing module is configured to assign a score to each record of the consideration set of records. A results generation module configured is to respond to the user device with a subset of the consideration set of records. The subset is selected based on the assigned scores. The subset identifies application states of applications that are relevant to the search query.

A computerized method for transforming an input text string includes storing a plurality of tokens in a dictionary data store. Each token is associated with a score. Each token is a string of one or more characters. The input text string is an ordered set of characters. The method includes generating a chart parse of the input text string. The chart parse includes a plurality of entries. Each entry includes (i) an indication of a start character of the entry within the input text string and (ii) an indication of an end character of the entry within the input text string. Generating the chart parse includes, for each position within the input text string, (i) identifying a string of at least one consecutive character in the input text string that begins at that position and matches one of the plurality of tokens and (ii) unless the identified string is a single character matching the start character for another entry in the chart parse, creating an entry corresponding to the identified string. The method includes determining a selected partition of the input text string based on the entries of the chart parse. The selected partition includes an array of tokens such that a concatenation of the array of tokens matches the ordered set of characters of the input text string. Each of the array of tokens is selected from the chart parse. A score of the selected partition is based on a sum of, for each token of the array of tokens, the score specified by the dictionary data store. The selected partition is a minimum score partition.

In other features, generating the chart parser further includes, for each position within the input text string, (i) identifying a string of consecutive characters in the input text string that ends at that position and matches one of the plurality of tokens and (ii) unless the identified string is a single character matching the end character for another entry in the chart parse, creating an entry corresponding to the identified string. In other features, for each entry, the indication of the start character of the entry within the input text string and the indication of the end character of the entry within the input text string are specified as one of (i) a numerical start position within the input text string and a numerical end position within the input text string, (ii) the numerical start position within the input text string and a numerical length, and (iii) the numerical length and the numerical end position within the input text string.

In other features, the method includes creating a hash map that stores hash values of a set of tokens from the dictionary data store. The method further includes calculating a hash value of a candidate token from the input text string. Presence of the calculated hash value in the hash map indicates that the candidate token matches one of the set of tokens. In other features, the set of tokens is a proper subset of the plurality of tokens in the dictionary data store. The method includes selecting the set of tokens from the plurality of tokens based on a domain of the input text string. In other features, the scores associated with the set of tokens are dependent on the domain.

In other features, the method includes generating a second chart parse by, for each position within the input text string, (i) identifying a string of consecutive characters in the input text string that ends at that position and matches one of the plurality of tokens and (ii) unless the identified string is a single character matching the end character for another entry in the second chart parse, creating an entry in the second chart parse corresponding to the identified string. In other features, the method includes determining a first partition of the input text string having a first score using the entries of the chart parse, determining a second partition of the input text string having a second score using the entries of the second chart parse, designating the first partition as the selected partition in response to the first score being lower than the second score, and designating the second partition as the selected partition in response to the second score being lower than the first score.

In other features, the score of the selected partition is equal to the sum of, for each token of the array of tokens, the score specified by the dictionary data store. In other features, for each token in the dictionary data store, the associated score is based on frequency of occurrence of the token. In other features, the method includes, for each token in the dictionary data store, calculating the associated score by taking an inverse logarithm of the frequency of occurrence of the token.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

System

Figure 1:
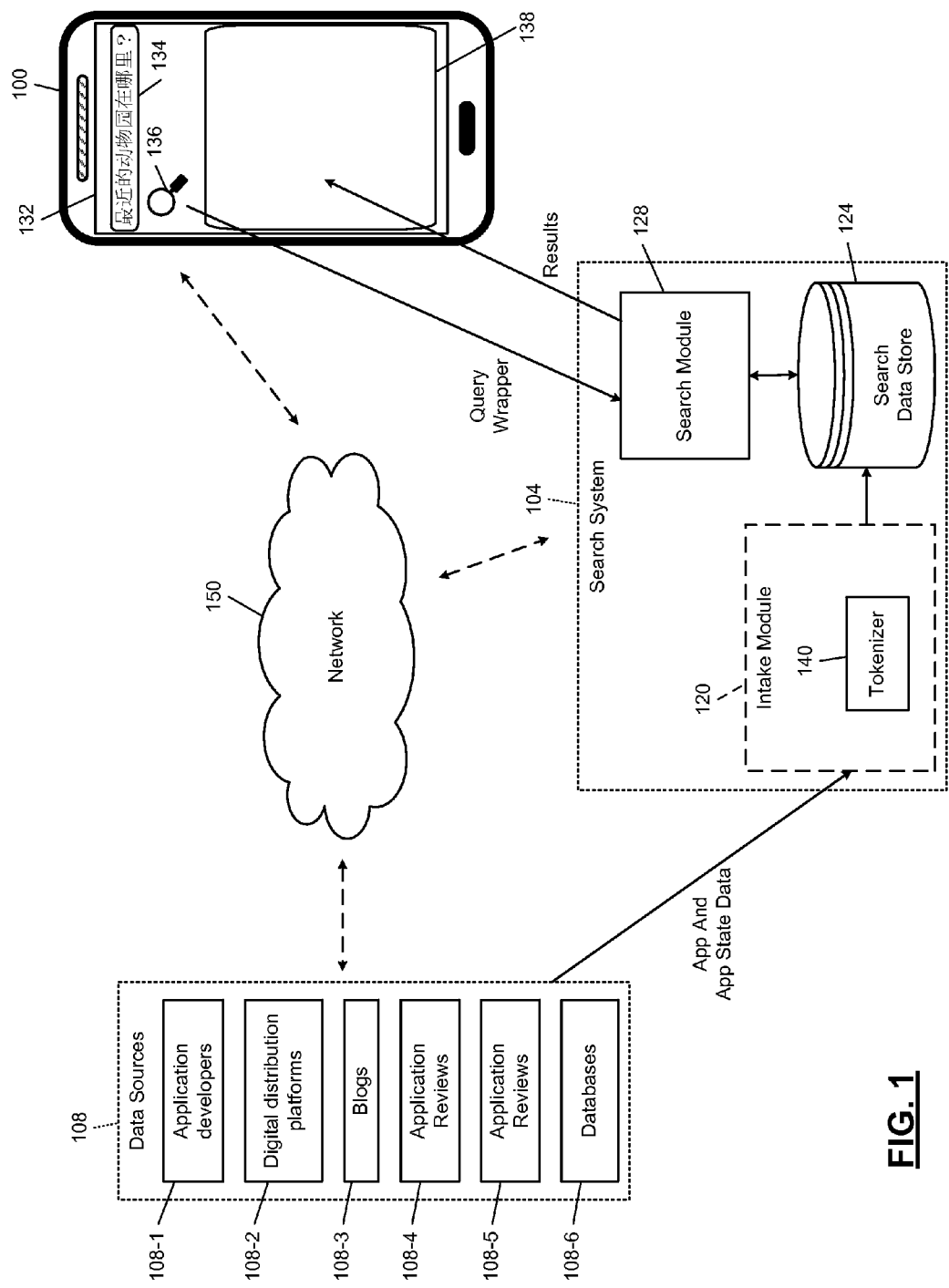
FIG. 1 is a combined functional block diagram and graphical user interface example according to the principles of the present disclosure.

In FIG. 1, an example user device 100 communicates with a search system 104 to obtain results for a search query. The user device 100 may include a smartphone, laptop, tablet, or any other computing device, such as a gaming device, a vehicle infotainment device, a wearable device, or a smart appliance (such as a smart refrigerator or smart television). In a business-to-business context, the user device 100 may be replaced by a server, where the server requests search results from the search system 104 in order to present data to an end user.

The search system 104 may obtain search data from data sources 108. The search system 104 includes an intake module 120 that receives data from the data sources 108. For example, the data may be related to applications and data from application states. An application state may refer to a screen of an application in which a user can perform a function. For example, the function may include retrieving data, such as looking at weather information. In another application state, the function may be booking a hotel or reviewing a restaurant. The intake module 120 processes the application data and application state data and provides the processed data to a search data store 124.

A search module 128 receives a search query from the user device 100 and, based on data from the search data store 124, responds to the user device 100 with results. In FIG. 1, an unsophisticated search app 132 is shown executing on the user device 100. The search app 132 includes a query box 134 where a user can enter a text query and a search button 136 that, when actuated by the user, sends a query wrapper to the search module 128. Results from the search module 128 are provided to a results window 138 of the search app 132.

For example, the results may include data obtained from an application or from an application state. In other implementations, the results may include access mechanisms for applications and application states. The access mechanisms allow the user device 100 to download, install, open, or navigate to certain applications or certain states of applications. The results may be accompanied by metadata, such as images or text. In various implementations, some or all of the results may be presented in a deep view card (DVC) format.

A DVC for an application or a state of an application shows additional information, not just the identification of the application or application state. For example, the information may include a title of the application state or a description of the application state, which may be a snippet of text from the application state. Other metadata may be provided from the application state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping application to get navigation directions to the establishment. Other interactions with the DVC (such as tapping or clicking any other area of the DVC) may take the user to the indicated state or application. As described in more detail below, this may be accomplished by opening the relevant app or, if the app is not installed, opening a website related to the desired application state. In other implementations, an app that is not installed may be downloaded, installed, and then executed in order to reach the desired application state.

In other words, a DVC includes identifying information for the application or state as well as additional content from the application or state itself. The additional content allows the user to make a more informed choice about which result to choose, and may even allow the user to directly perform an action without having to navigate to the application state. If the action the user wants to take is to obtain information, in some circumstances the DVC itself may provide the necessary information.

The intake module 120 may process incoming data using a tokenizer 140 that splits incoming data into separate tokens. The search data store 124, as described in more detail below, may compare tokens from a search query with tokens stored in the search data store 124. The search module 128 may also include a tokenizer according to the principles of the present disclosure, which splits the search query into separate tokens for querying the search data store 124.

The search data store 124 may be maintained and updated by the intake module 120 and/or a maintenance component (not shown) of the search system 104 from the data sources 108. The search data store 124 may store data in databases, indices, tables, files, and other data structures, which may be populated from the data sources 108. The search data store 124 may store application state records corresponding to specific states of applications.

The intake module 120 may include various parsers and other ETL (extract, transform, and load) processes to adapt data from the data sources 108 for storage in the search data store 124. In some implementations, data may be manually entered and/or manually transformed into a format usable by the search data store 124. The data sources 108 may include data from application developers 108-1, such as application developers' websites and data feeds provided by developers.

The data sources 108 may include digital distribution platforms 108-2, accessed via the web or via an app. Digital distribution platforms provide native applications to user devices. Example digital distribution platforms include the GOOGLE PLAY digital distribution platform by Google, Inc., the APP STORE digital distribution platform by Apple, Inc., and the WINDOWS PHONE digital distribution platform by Microsoft Corp.

The data sources 108 may also include other websites, such as blogs 108-3, application review websites 108-4, and social networking sites 108-5, such as the FACEBOOK social networking application and website by Facebook, Inc. and the TWITTER social networking application and website by Twitter, Inc.

The data sources 108 may also include online databases 108-6 of data related to movies, television programs, music, restaurants, etc. Each of the data sources 108 may have independent ontologies and may be updated at different rates. Therefore, the search data store 124 may be updated from each of the data sources 108 at different rates. In addition, credibility and accuracy of data may differ across the data sources 108. Measures of reliability, timeliness, and accuracy may be stored in the search data store 124 and may be used to weight search results obtained from the data sources 108.

While FIG. 1 shows the search system 104 receiving data from the data sources 108 and shows the user device 100 and the search system 104 communicating with each other, the communication may actually be carried over a network 150, as indicated by the dashed lines. The network 150 may encompass local area networks, mobile phone provider networks, and a distributed communications network, such as the Internet.

Search Module

Figure 2:
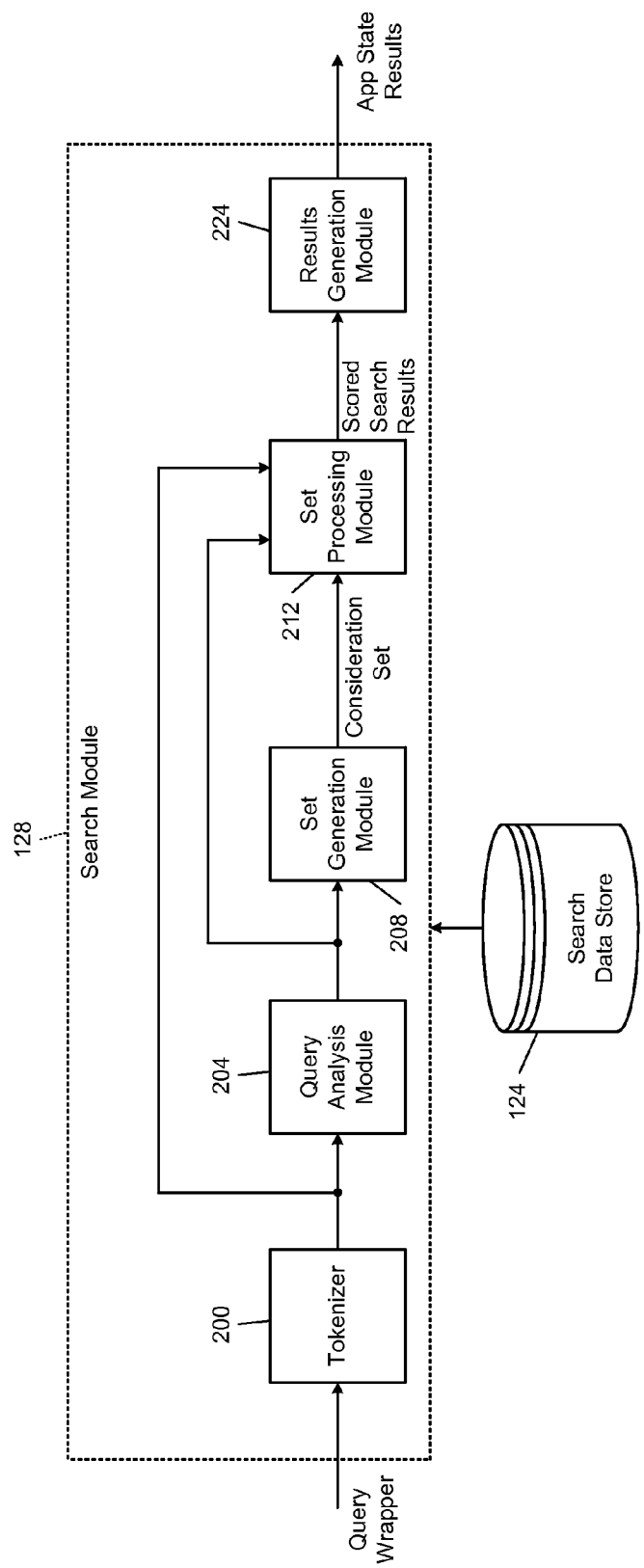
FIG. 2 is a functional block diagram of an example implementation of a search module.

In FIG. 2, an example implementation of the search module 128 includes a tokenizer 200 that processes a query wrapper from a user device. The tokenizer 200 may split (or, partition) an input text query into separate tokens and provide those tokens to a query analysis module 204. In various implementations, the tokenizer 200 may provide multiple different potential tokenizations of an input string. For example, two potential tokenizations, each determined to be equally reliable by the tokenizer 200, may be provided to the query analysis module 204.

The query analysis module 204 analyzes the tokenized text query from the query wrapper. For example, the query analysis module 204 may filter the query tokens, and perform word stemming, synonymization, and stop word removal. The query analysis module 204 may also analyze additional data stored within the query wrapper. The query analysis module 204 provides the tokenized query to a set generation module 208.

The set generation module 208 identifies a consideration set of application (or, equivalently, app) state records from a search data store 124 based on the query tokens. In various implementations, the search data store 124 may also include app records. In various implementations, an app record may be stored as an app state record that simply has a predetermined value, such as null, for the specific state of the app.

App state records in the search data store 124 may be generated by crawling and scraping apps according to the principles of the present disclosure. Some or all of the contents of the records of the search data store 124 may be indexed in inverted indices. In some implementations, the set generation module 208 uses the APACHE LUCENE software library by the Apache Software Foundation to identify records from the inverted indices. The set generation module 208 may search the inverted indices to identify records containing one or more query tokens. As the set generation module 208 identifies matching records, the set generation module 208 can include the unique ID of each identified record in the consideration set. For example, the set generation module 208 may compare query terms to an app state name and app attributes (such as a text description and user reviews) of an app state record.

Further, in some implementations, the set generation module 208 may determine an initial score of the record with respect to the search query. The initial score may indicate how well the contents of the record matched the query. For example, the initial score may be a function of term frequency-inverse document frequency (TF-IDF) values of the respective query terms.

A set processing module 212 receives unique IDs of app state records identified by the set generation module 208 and determines a result score for some or all of the IDs. A result score indicates the relevance of an app state with respect to the tokenized query and context parameters. In various implementations, a higher score indicates a greater perceived relevance. The set processing module 212 may also receive the tokenized query from the tokenizer 200.

Context parameters may be derived from other items in the query wrapper. Geolocation data may limit the score of (or simply remove altogether) apps that are not pertinent to the location of the user device. A blacklist in the query wrapper may cause the set processing module 212 to remove app records and/or app state records from the consideration set that match the criteria in the blacklist. Effective removal may be accomplished by setting their score to a null value, such as zero.

The set processing module 212 may generate a result score based on one or more scoring features, such as record scoring features, query scoring features, and record-query scoring features. Example record scoring features may be based on measurements associated with the record, such as how often the record is retrieved during searches and how often links generated based on the record are selected by a user. Query scoring features may include, but are not limited to, the number of tokens in the search query, the popularity of the search query, and the expected frequency of the tokens in the search query. Record-query scoring features may include parameters that indicate how well the terms of the search query match the terms of the record indicated by the corresponding ID.

The set processing module 212 may include one or more machine-learned models (such as a supervised learning model) configured to receive one or more scoring features. The one or more machine-learned models may generate result scores based on at least one of the record scoring features, the query scoring features, and the record-query scoring features.

For example, the set processing module 212 may pair the search query with each app state ID and calculate a vector of features for each {query, ID} pair. The vector of features may include one or more record scoring features, one or more query scoring features, and one or more record-query scoring features. In some implementations, the set processing module 212 normalizes the scoring features in the feature vector. The set processing module 212 can set non-pertinent features to a null value or zero.

The set processing module 212 may then input the feature vector for one of the app state IDs into a machine-learned regression model to calculate a result score for the ID. In some examples, the machine-learned regression model may include a set of decision trees, such as gradient-boosted decision trees (GBDT). Additionally or alternatively, the machine-learned regression model may include a logistic probability formula. In some implementations, the machine-learned task can be framed as a semi-supervised learning task, where a minority of the training data is labeled with human-curated scores and the rest is used without human labels.

The machine-learned model outputs a result score of the ID. The set processing module 212 can calculate result scores for each of the IDs that the set processing module 212 receives. The set processing module 212 associates the result scores with the respective IDs and outputs the most relevant scored IDs.

A results generation module 224 may choose specific access mechanisms from the application records and app state records chosen by the set processing module 212. The results generation module 224 then prepares a results set to return to the user device. Although called "app state results" here, some of the access mechanisms may correspond to a default state (such as a home page) of an app—these may be a special case of an app state record or may be an app record.

The results generation module 224 may select an access mechanism for an app state record based on whether the app is installed on the device. If the app is installed, an access mechanism that opens the app directly to the specified state is selected. Meanwhile, if the app is not installed, a selected access mechanism first downloads and installs the app, such as via a script, before opening the app to the specified state. Opening the app to the specified state may include a single command or data structure (such as an intent in the ANDROID operating system) that directly actuates the specified state. For other apps, a script or other sequence may be used to open the app to a certain state (such as a home, or default, state) and then navigate to the specified state.

The results generation module 224 may generate or modify access mechanisms based on the operating system identity and version for the user device to which the results are being transmitted. For example, a script to download, install, open, and navigate to a designated state may be fully formed for a specific operating system by the results generation module 224.

If the results generation module 224 determines that none of the native access mechanisms are likely to be compatible with the user device, the search module 200 may send a web access mechanism to the user device. If no web access mechanism is available, or would be incompatible with the user device for some reason (for example, if the web access mechanism relies on the JAVA programming language, which is not installed on the user device), the results generation module 224 may omit the result.

App State Records

Figure 3:
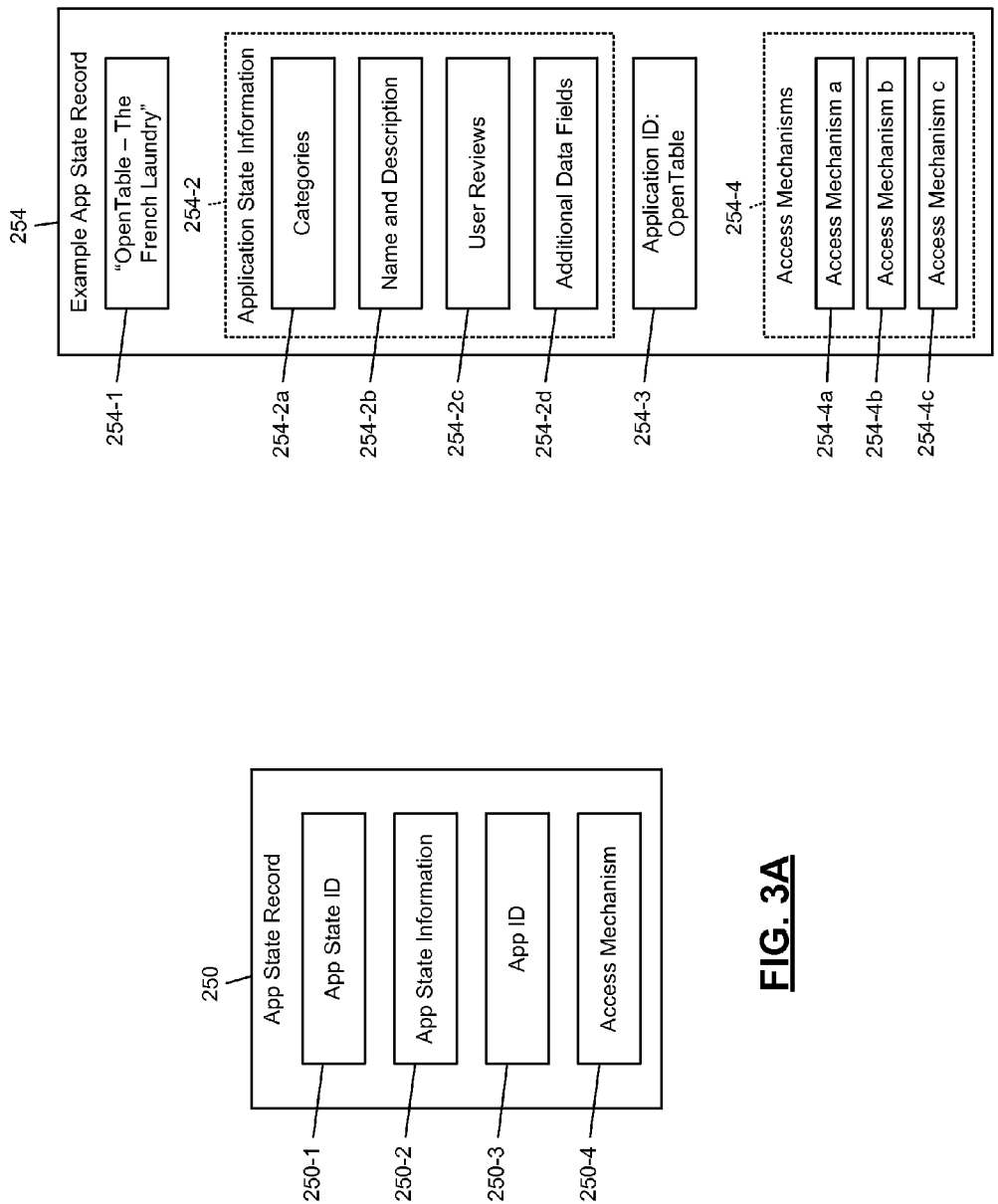
FIG. 3A is a graphical representation of an example application state record format.
FIG. 3B is a graphical representation of an example application state record according to the format of FIG. 3A.

In FIG. 3A, an example format of an app state record 250 includes an app state identifier (ID) 250-1, app state information 250-2, an app identifier (ID) 250-3, and one or more access mechanisms 250-4. The app state ID 250-1 may be used to uniquely identify the app state record 250 in the search data store 124. The app state ID 250-1 may be a string of alphabetic, numeric, and/or special (e.g., punctuation marks) characters that uniquely identifies the associated app state record 250. In some examples, the app state ID 250-1 describes the application state in a human-readable form. For example, the app state ID 250-1 may include the name of the application referenced in the access mechanisms 250-4.

In a specific example, an app state ID 250-1 for an Internet music player application may include the name of the Internet music player application along with the song name that will be played when the Internet music player application is set into the specified state. In some examples, the app state ID 250-1 is a string formatted similarly to a uniform resource locator (URL), which may include an identifier for the application and an identifier of the state within the application. In other implementations, a URL used as the app state ID 250-1 may include an identifier for the application, an identifier of an action to be provided by the application, and an identifier of an entity that is the target of the action.

For example only, see FIG. 3B, which shows an example app state record 254 associated with the OPENTABLE application from OpenTable, Inc. The OPENTABLE application is a restaurant-reservation application that allows users to search for restaurants, read reviews, and make restaurant reservations. The example app state record 254 of FIG. 3B describes an application state of the OPENTABLE application in which the OPENTABLE application accesses information for THE FRENCH LAUNDRY restaurant, a Yountville, Calif. restaurant. An app state ID 254-1 for the example app state record 254 is shown as "OpenTable—The French Laundry."

Another implementation of the displayed app state ID 254-1 is based on a triplet of information: {application, action, entity}. The triplet for the app state record 254 may be {"OpenTable", "Show Reviews", "The French Laundry"}. As mentioned above, this triplet may be formatted as a URL, such as the following:

"func://www.OpenTable.com/Show_Reviews/The_French_Laundry." Note that a different namespace is used ("func://") to differentiate from the standard web namespace ("http://"), as the URL-formatted ID may not resolve to an actual web page. For example only, the OpenTable website may use a numeric identifier for each restaurant in their web URLs instead of the human-readable "The_French_Laundry."

Continuing with FIG. 3A, the app state information 250-2 may include data that describes an app state into which an application is set according to the access mechanisms 250-4. The types of data included in the app state information 250-2 may depend on the type of information associated with the app state and the functionality specified by the access mechanisms 250-4. The app state information 250-2 may include a variety of different types of data, such as structured, semi-structured, and/or unstructured data. The app state information 250-2 may be automatically and/or manually generated and updated based on documents retrieved from various data sources, which may include crawling of the apps themselves.

In some examples, the app state information 250-2 includes data presented to a user by an application when in the app state corresponding to the app state record 250. For example, if the app state record 250 is associated with a shopping application, the app state information 250-2 may include data that describes products (such as names and prices) that are shown in the app state corresponding to the app state record 250. As another example, if the app state record 250 is associated with a music player application, the app state information 250-2 may include data that describes a song (such as by track name and artist) that is played or displayed when the music player application is set to the specified app state.

When the app state record 250 corresponds to a default state of an application, the app state information 250-2 may include information generally relevant to the application and not to any particular app state. For example, the app state information 250-2 may include the name of the developer of the application, the publisher of the application, a category (e.g., genre) of the application, a text description of the application (which may be specified by the application's developer), and the price of the application. The app state information 250-2 may also include security or privacy data about the application, battery usage of the application, and bandwidth usage of the application. The app state information 250-2 may also include application statistics, such as number of downloads, download rate (for example, average downloads per month), download velocity (for example, number of downloads within the past month as a percentage of total downloads), number of ratings, and number of reviews.

In FIG. 3B, the example app state record 254 includes app state information 254-2, including a restaurant category field 254-2a of THE FRENCH LAUNDRY restaurant, a name and text description field 254-2b of THE FRENCH LAUNDRY restaurant, user reviews field 254-2c of THE FRENCH LAUNDRY restaurant, and additional data fields 254-2d.

The restaurant category field 254-2a may include multiple categories under which the restaurant is categorized, such as the text labels "French cuisine" and "contemporary." The name and description field 254-2b may include the name of the restaurant ("The French Laundry") and text that describes the restaurant. The user reviews field 254-2c may include text of user reviews for the restaurant. The additional data fields 254-2d may include additional data for the restaurant that does not specifically fit within the other defined fields, such as a menu, prices, and operating hours.

Continuing with FIG. 3A, the app ID 250-3 uniquely identifies an application associated with the app state record 250. For example, a value for application ID 254-3 in the app state record 254 uniquely identifies the OpenTable application. The application ID 254-3 may refer to a canonical OpenTable software product that encompasses all of the editions of the OpenTable application, including all the native versions of the OpenTable application across platforms (for example, IOS and ANDROID operating systems) and any web editions of the OpenTable application.

The access mechanisms 250-4 specify one or more ways that the state specified by the app state record 250 can be accessed. For any given user device, only some of the access mechanisms 250-4 may be relevant. For illustration, the example app state record 254 depicts three access mechanisms 254-4, including access mechanism "a" 254-4a, access mechanism "b" 254-4b, and access mechanism "c" 254-4c.

For example, the access mechanism 250-4a may include a reference to a native IOS operating system edition of the OPENTABLE application along with one or more operations to be performed by the user device. For example, the access mechanism 250-4a may include an application resource identifier for the native iOS edition of the OPENTABLE application and one or more operations that navigate to the state in the OPENTABLE application for THE FRENCH LAUNDRY restaurant.

The access mechanism 250-4b may include a reference to a native ANDROID operating system edition of the OPENTABLE application along with one or more operations to be performed by the user device to navigate to the state in the ANDROID OPENTABLE application for THE FRENCH LAUNDRY. The access mechanism 250-4c may include a reference to a web edition of the OPENTABLE application, such as a URL that corresponds to a web page for THE FRENCH LAUNDRY restaurant on the OPENTABLE web site.

Block Diagram

Figure 4:
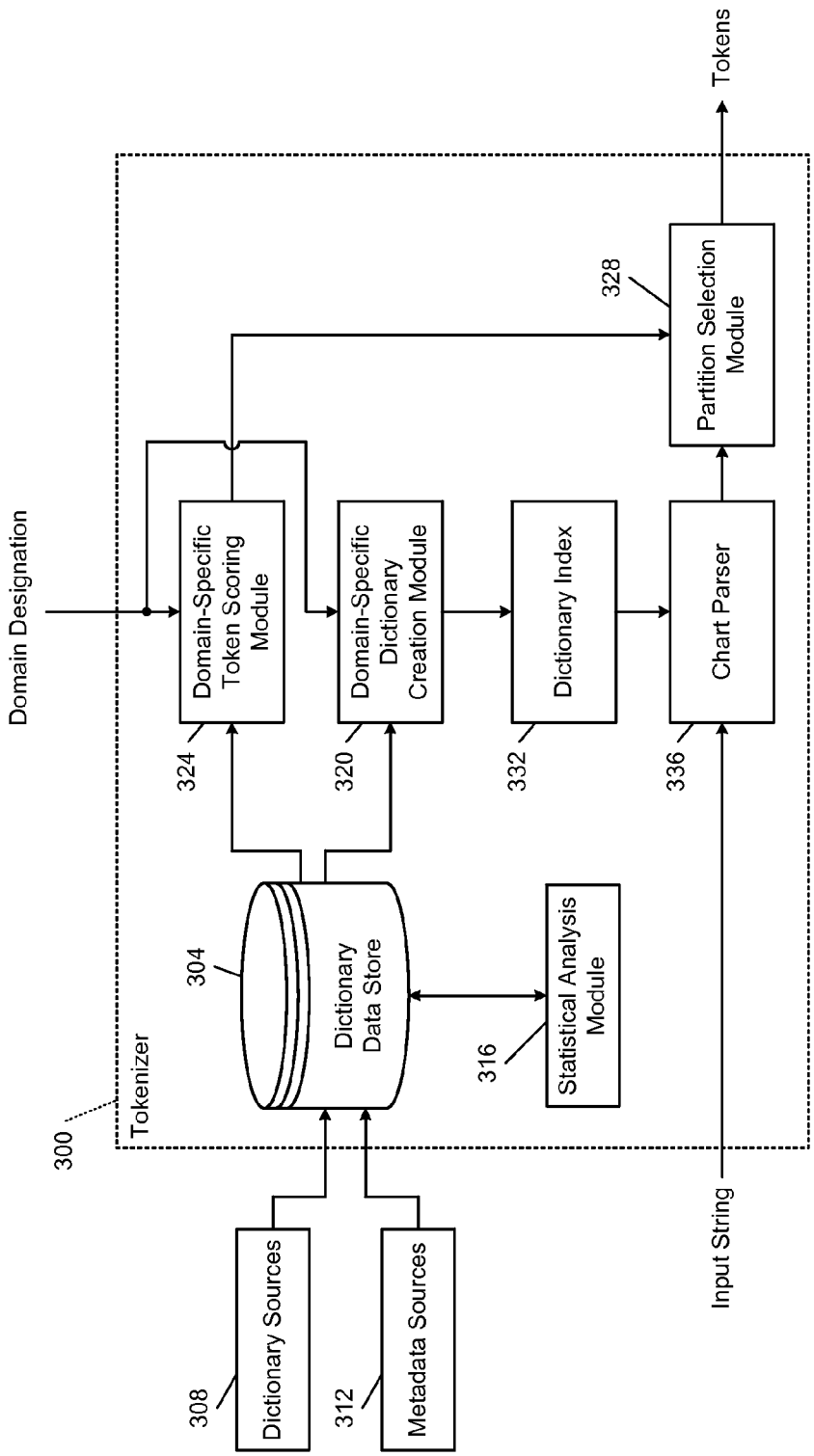
FIG. 4 is a functional block diagram of an example implementation of a tokenizer.

FIG. 4 shows a tokenizer 300 that is an example implementation of either or both of the tokenizer 200 of FIG. 2 and the tokenizer 140 of FIG. 1. The tokenizer 300 includes a dictionary data store 304. The dictionary data store 304 receives data from dictionary sources 308 and metadata sources 312. In various implementations, the dictionary sources 308 and the metadata sources 312 may be a subset of the data sources 108 of FIG. 1.

The dictionary data store 304, as described in more detail below, receives tokens from the dictionary sources 308 and information about those tokens, such as their reliability or relevance to a particular domain, from the metadata sources 312. Some data sources may provide both dictionary and metadata information.

The dictionary data store 304 may also store statistical analysis data related to tokens. A statistical analysis module 316 may analyze data stored in the dictionary data store 304 and/or data arriving from the dictionary sources 308 and the metadata sources 312 to determine, for example, term frequency for tokens in the dictionary data store 304.

A domain-specific dictionary creation module 320 groups together tokens from the dictionary data store 304 that are specific to a domain. For example, if it is known that an input query is for a mobile application, tokens from a list of mobile application names will be most relevant. The domain designation may be provided by a search query itself or may be preset. For example, when a tokenizer 300 is used in a context where application queries will be made (that is, queries made by a user to find applications they wish to install on their device), the domain designation may be fixed.

However, if the input string is completely unknown, the domain-specific dictionary creation module 320 may use all tokens from the dictionary data store 304 that have a reliability index above a predetermined threshold. The reliability index may be provided by or calculated from the metadata sources 312. For example, a list of slang tokens that are not widely used may have a low reliability index. Similarly, tokens for very esoteric domains, such as tokens used for etymology of older versions of a language, may have a lower reliability index.

A domain-specific token scoring module 324 calculates scores for each token based on the specified domain. The domain-specific token scoring module 324 assigns scores to tokens based on their relevance of the particular domain. Further examples are shown below.

A dictionary index 332 is a data structure that stores the domain-specific dictionary tokens in an easily-identifiable form, such as a hash-map. In a hash-map, hashes of the tokens in the domain-specific dictionary are stored in a data structure that allows for fast lookup based on a candidate hash. The hash of an input token is calculated and compared to the hash-map. If a match in the hash-map is found, the input token is determined to be a match for a token in the dictionary.

A chart parser 336 parses the input string based on the dictionary hash-map 332 as described in more detail below. The chart parser 336 may determine a forward chart parse as well as a reverse chart parse (also referred to as a left chart parse and a right chart parse, respectively). The combination of the forward chart parse and the reverse chart parse created by the chart parser 336 is provided to a partition selection module 328.

The partition selection module 328 selects a tokenization of the input string based on finding a lowest cost (or, score) partition of the chart parse. The selected tokenization is output as a set of separate tokens. Scores for each token in the chart parse is received from the domain-specific token scoring module 324.

Flowchart

Figure 5:
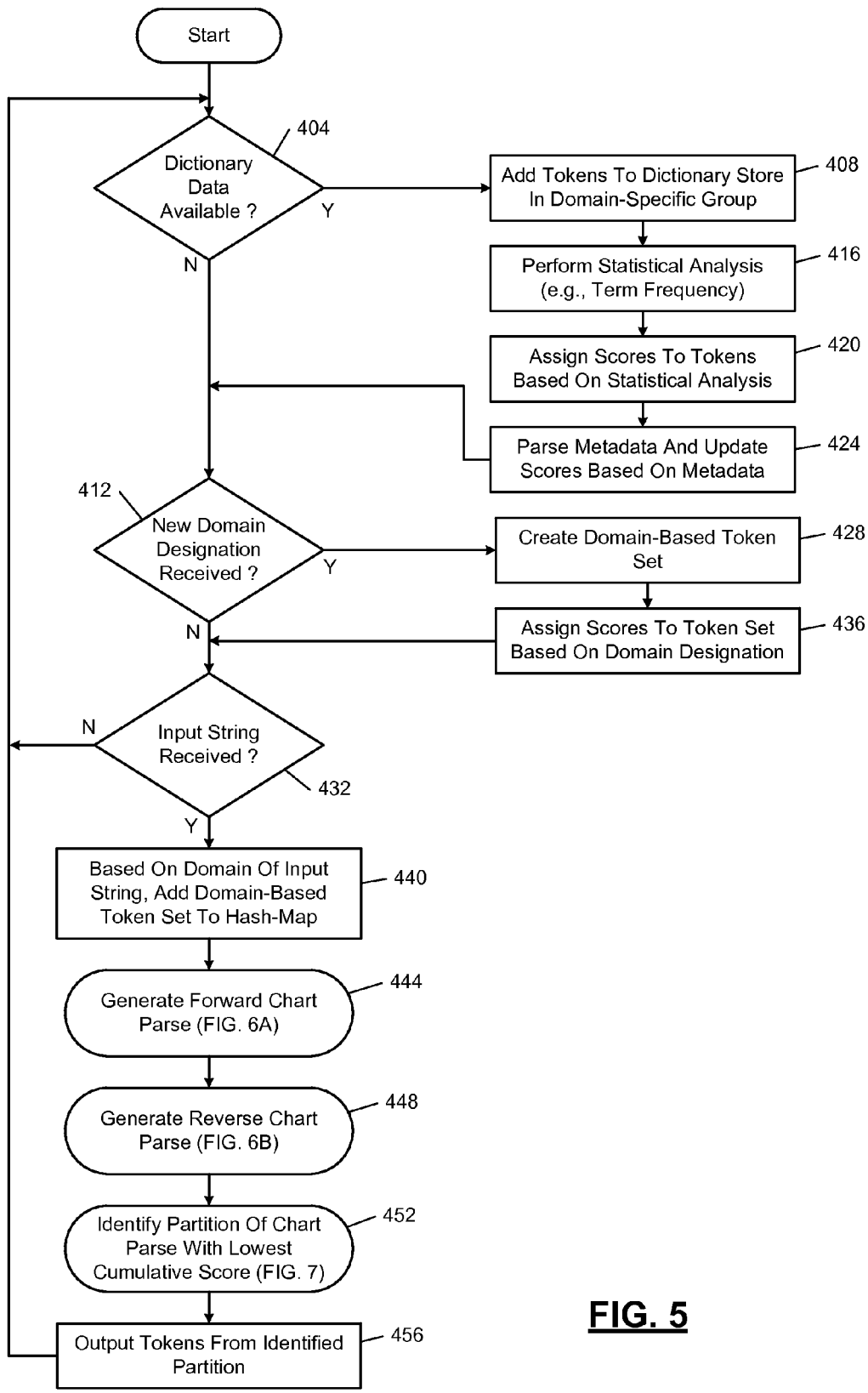
FIG. 5 is a flowchart of example operation of overall dictionary maintenance and input string processing operations.

In FIG. 5, overall operation of a tokenizer is shown, including both the maintenance of dictionary data as well as parsing of input strings. In various implementations, dictionary maintenance and parsing may be run as separate processes on the same or different hardware. They may be performed asynchronously and may overlap in time. In one example of splitting this functionality, a hash-map may be created at the beginning of a passing process from whatever dictionary is presently finalized. Once a new dictionary is created and/or an old dictionary is updated, the finalized dictionary is replaced. The hash-map may act as a snapshot in time of the dictionary so that later dictionary changes don't take effect during the middle of the parsing process.

In one coordinated implementation, control begins at 404, where control determines whether new dictionary data is available. If so, control transfers to 408; otherwise, control transfers to 412. At 408, control adds tokens from the available dictionary data to a dictionary store in a domain-specific group. The domain-specific group may include nomenclature specific to a domain, such as application names, place names, event names, movie names, etc. Depending on the domain within which input text will be parsed, restricting the potential tokens to those tokens common to a relevant domain may lead to faster and more accurate tokenization.

Control continues at 416, where control performs statistical analysis on the tokens in the domain-specific group. For example, statistical analysis may include determining term frequency of each token. For example only, when additional tokens are added to an existing domain-specific group, statistics of the new tokens are calculated while statistics of the existing tokens are simply revised (such as with a numerical offset).

Control continues at 420, where control assigns scores to the tokens based on the statistical analysis. For example, the score of a token may be based on an inverse logarithm of the frequency of the term. In other words, a higher frequency of occurrence leads to a lower score. At 424, control parses metadata and updates scores based on the metadata. For example only, metadata may indicate that a set of terms are rare forms of various words. This metadata may be used to update the scores. For example, the metadata may indicate that a particular token is rarely used and therefore should have a higher score (making it less likely to appear in a final tokenization). Control continues at 412.

At 412, control determines whether a new domain designation has been received. If so, control transfers to 428; otherwise, control transfers to 432. At 428, control creates a domain-based token set. This domain-based token set may specify words from various dictionaries. For example, a new domain created for events may incorporate locations, times, and performers.

At 436, control assigns a score to each token based on the domain designation. In various implementations, a token may have a different score depending on which domain the token is used in. For example, the token "Madonna" may be assigned a low score (meaning the token is more likely to be the correct interpretation) for an event domain but a higher score for an application name domain, corresponding to the greater likelihood that the name "Madonna" would be used for events than for application names. Control then continues at 432. In other implementations, higher scores rather than lower scores may be used to indicate a greater likelihood of being correct. For the present disclosure, however, lower scores will be used to indicate a greater likelihood relevance.

At 432, control determines whether an input string has been received for tokenization. If so, control transfers to 440; otherwise, control returns to 404. At 440, control determines a domain of the input string and adds a set of tokens based on the domain to a hash-map. In various implementations, hash-maps for commonly used domains may be pre-generated and updated when new dictionary data is available instead of being generated on the fly.

Figure 6A:
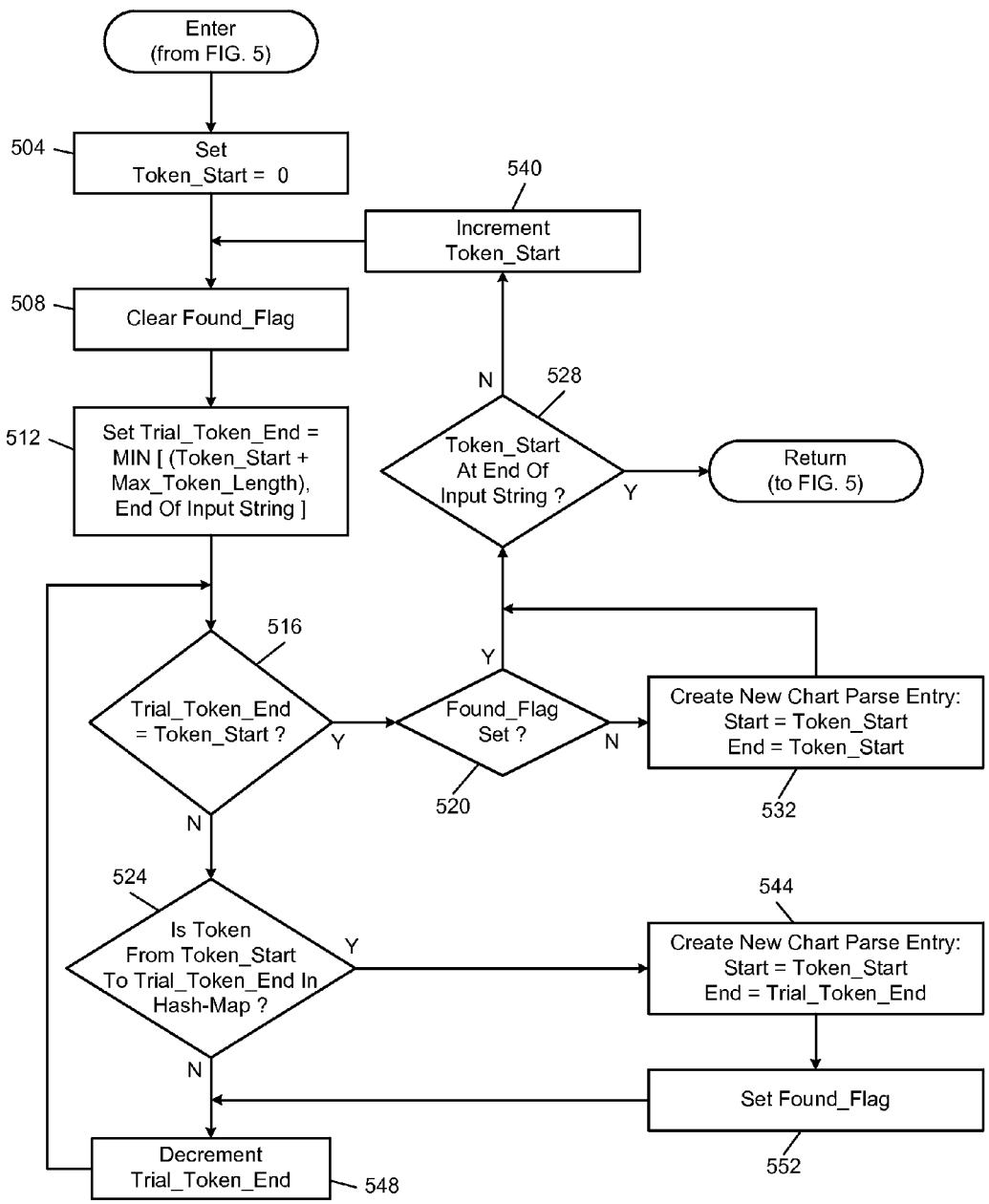
FIG. 6A is a flowchart of example operation for creating a forward chart parse.
Figure 6B:
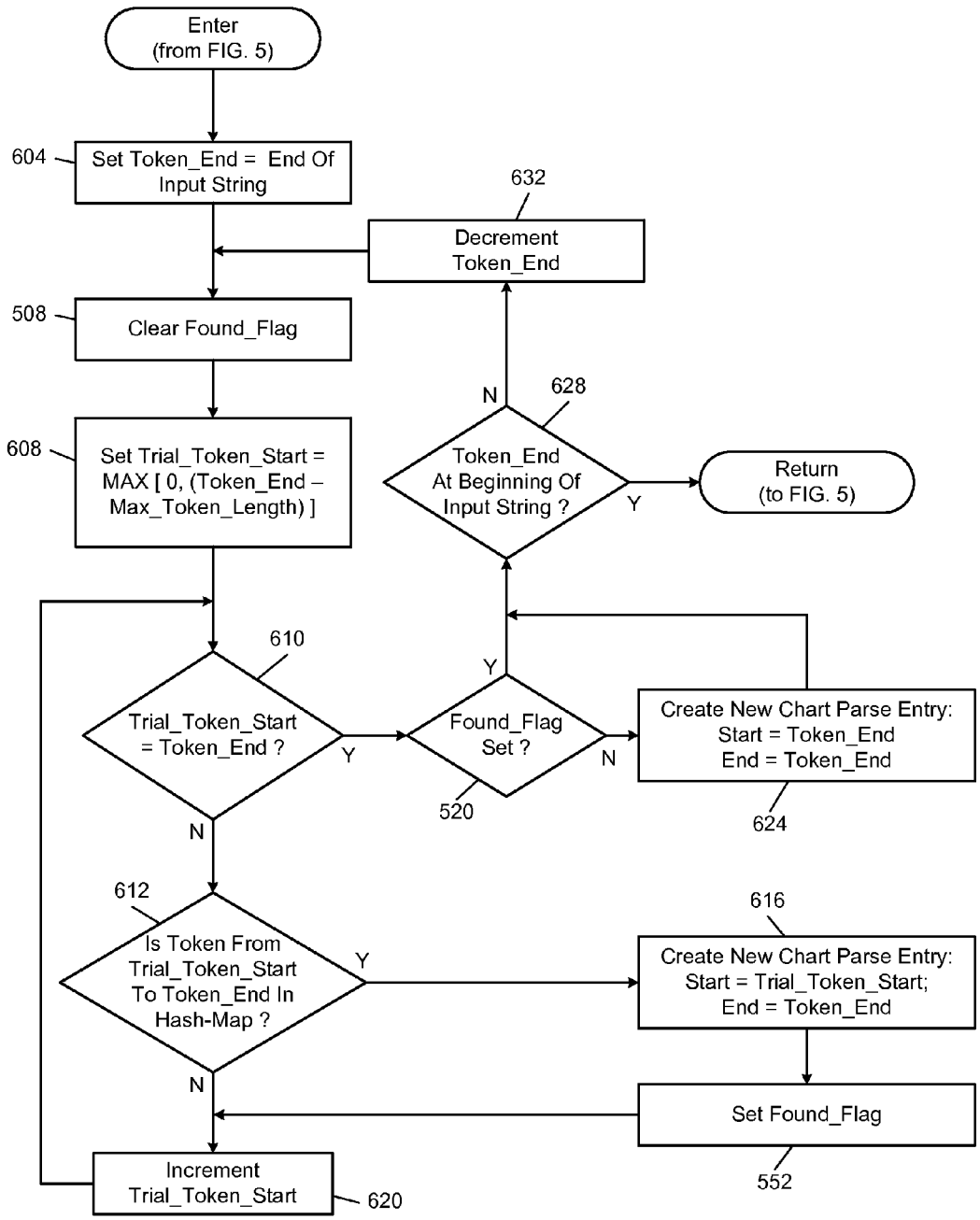
FIG. 6B is a flowchart of example operation for creating a reverse chart parse.
Figure 7:
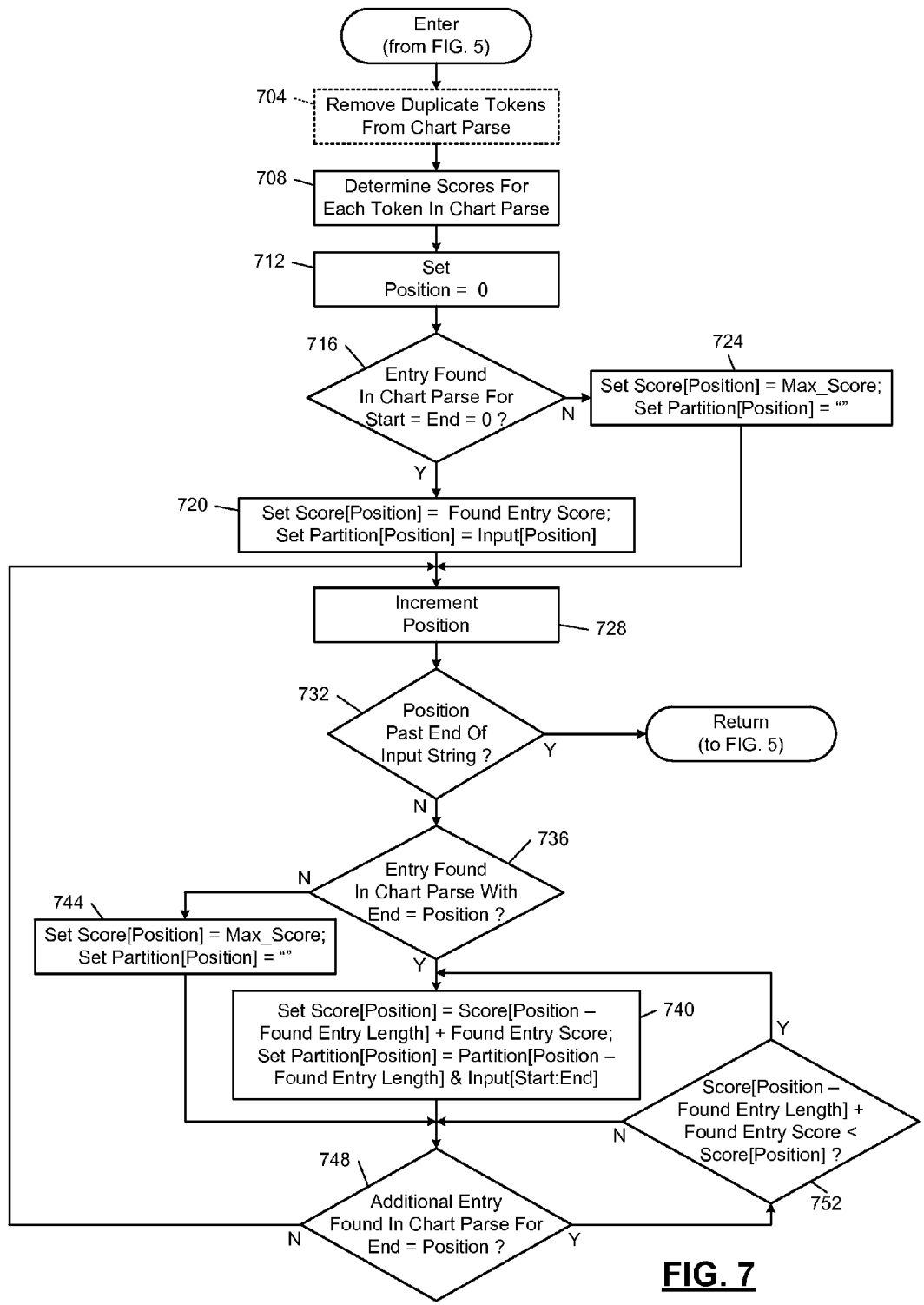
FIG. 7 is a flowchart depicting an example operation of identifying a partition of a generated chart parse.

At 444, control generates a forward chart parse, such as is shown in FIG. 6A. At 448, control generates a reverse chart parse, such as is shown in FIG. 6B. At 452, control identifies a partition of a chart parse that has the lowest cumulative score, such as is shown in FIG. 7. In various implementations, the forward and reverse chart parses are not separate, and there is a single chart parse cumulatively populated by the processing in both forward and reverse directions. At 456, control outputs tokens from the identified partition as the tokenization of the input string. In various implementations, multiple tokenizations may be provided, such as if the scores of two different candidate tokenizations are the same. Control then returns to 404.

In FIG. 7 below, a dynamic programming analysis is performed on a combined chart parse that includes the chart parse entries from both the forward chart parse and the reverse chart parse. The dynamic programming analysis of FIG. 7 iterates from the beginning of the input string toward the end of the input string but equivalently could progress from the end of the input string to the beginning of the input string.

In other implementations, dynamic programming analysis may be performed on the forward chart parse and the reverse chart parse separately. The results from each dynamic programming analysis may be compared, with the lower score being selected. In situations where dynamic programming analysis identifies multiple equal-score partitions of the chart parse, tokens from these identified alternative partitions may be output in 456 of FIG. 5.

Chart Parse

In FIG. 6A, creation of a forward chart parse begins at 504, where a position counter, called Token_Start, is initialized to zero (in other words, pointing to the first character of the input string). At 508, control clears a flag, Found_Flag, whose usage will be discussed in more detail below. At 512, control sets a test variable, Trial_Token_End, to the minimum of (i) the position at the end of input string and (ii) the sum of Token_Start and the maximum token length. The maximum token length may be determined by traversing the listed tokens in the hash-map and identifying the length of the longest token. As examples, a maximum token length of a hypothetical set of tokens may be 5 or 6.

The maximum token length is added to Token_Start to test whether any tokens having the maximum length begin at Token_Start. In case Token_Start is too close to the end of the string, Trial_Token_End is set to the minimum of the end of the input string and this sum. As discussed in detail below, Trial_Token_End is then moved closer and closer to the beginning of the input string until Trial_Token_End is equal to Token_Start. At that point, the potential token is exactly one character in length. If no longer tokens have been found, the one-character token will be added to the chart parse. However, if any token longer than one character has been found, the one-character token will not be added to the chart parse.

Control progresses from 512 to 516, where control determines whether Trial_Token_End is equal to Token_Start. If so, control transfers to 520; otherwise, control transfers to 524. At 520, if Found_Flag is set, indicating that a token longer than one character has been found, control transfers to 528; otherwise, control transfers to 532.

In 532, no tokens longer than one character have been found and therefore a new one-character chart parse entry is created, where the start identifier and the end identifier are both equal to Token_Start. A predetermined score, such as 1, may be assigned to the chart parse entry.

Control continues at 528, where if Token_Start has reached the end of the input string, creation of the forward chart parse is complete and control therefore returns. Otherwise, control transfers to 540. At 540, Token_Start is incremented and control continues at 508.

At 524, control determines whether a candidate token including the characters from Token_Start to Trial_Token_End in the input string is present in the hash-map. If so, control transfers to 544; otherwise, control transfers to 548. For example, this may include calculating a hash of the candidate token and looking it up in the hash-map to determine whether there are any identical hashes in the hash-table. If so, the candidate token is considered to have been found.

At 544, control creates a new chart parse entry having a start parameter equal to Token_Start and an end parameter equal to Trial_Token_End. In various other implementations, the chart parse entry may equivalently have a start parameter and a length parameter or, as another equivalent, an end parameter and a length parameter.

Control continues at 552, where control sets Found_Flag, indicating that a token longer than one character has been found. Control then continues at 548. At 548, Trial_Token_End is decremented and control returns to 516.

In various implementations, the chart parse creation may be modified to be "greedy"—that is, omitting any chart parse entries that are not the longest possible token for a given position. One implementation of this alternative in FIG. 6A would be to proceed directly to 528 after creating the first chart parse entry in 544. This would avoid checking for any other (shorter) tokens that begin at Token_Start. The Found_Flag check could also be omitted—Trial_Token_End could only reach Token_Start at 516 if no longer tokens had been found, and so control could proceed directly to 532 from the yes (Y) branch of 516.

In other implementations, instead of trying to identify the longest possible token first and progressing toward the shortest token, the reverse could be performed: identifying whether a two-character token is present in the hash-map and progressing toward the longest possible token. With this reversal, some optimizations may be possible. To give a specific example, assume that starting at a certain character in a string, a three-character token is identified in the hash-map. Assume also that there are no longer tokens in the hash-map that begin with those three characters. There would then be no reason to check whether longer tokens with the same start character were present in the hash-map.

Ending the search for potential tokens early saves computing resources and decreases response times. Identifying whether longer tokens are present in the hash-map (or, more accurately, confirming that longer tokens are not present) may be accomplished using a Bloom filter.

In other implementations, the hash-map may be supplemented with dictionary-specific tags indicating whether longer tokens are present in the hash-map. Using the above example, it can be determined a priori that the three-character token is the longest token that begins with those three characters. A flag (such as a binary digit) having a certain value (such as 1) may indicate that the hash-table entry is the longest token beginning with those characters. For situations such as those in FIG. 6B, where the end of the token is fixed, another flag may be used to indicate that a hash-table entry is the longest token ending with those characters.

In FIG. 6B, creation of the reverse chart parse may be similar to that of the forward chart parse of FIG. 6A. In FIG. 6B, 604 replaces 512 of FIG. 6A. At 604, a position counter, Token_End, is initialized to the end of the input string.

At 608, which replaces 512 in FIG. 6A, control sets Trial_Token_Start to be equal to the maximum of (i) zero and (ii) the difference between Token_End and the maximum token length. In this way, Token_End indicates the end of a candidate token, while the beginning of the candidate token (Trial_Token_Start) is moved toward the beginning of the input string by the maximum token length. However, if Token_End is close enough to the beginning of the input string, this number may be negative, and therefore the maximum function is used to establish zero as a floor.

At 610, which replaces 516 of FIG. 6A, control determines whether Trial_Token_Start has reached the present value of Token_End. If so, control transfers to 520; otherwise control transfers to 612, which replaces 528 of FIG. 6A. At 612, control determines whether the token from Trial_Token_Start to Token_End is present in the hash-map. If so, control transfers to 616; otherwise, control transfers to 620. At 616, control creates a new chart parse entry where the start parameter of the entry is equal to Trial_Token_Start and the end parameter of the entry is equal to Token_End.

Meanwhile, at 620, control increments Trial_Token_Start to test shorter and shorter candidate tokens. At 624, which replaces 532 of FIG. 6A, control creates a new one-character chart parse entry with the start and the end equal to Token_End. At 628, which replaces 528 of FIG. 6A, control determines whether Token_End has reached the beginning of the input string. If so, control returns to FIG. 5; otherwise, control transfers to 632. At 632, Token_End is moved one character closer to the beginning of the input string.

Chart Parse Example

As an example, for the string "ABCD" (where, for simplicity, English letters are used as placeholders for Chinese characters), the following tokens are possible:

|   A    |    B        |    C       |    D           |
|--------|-------------|------------|----------------|
| A - fire | B - vehicle | C - ticket | D - money |
|        | AB - train  |            | CD - ticket price |
|        | BC - vehicle ticket |    |                |
|        | ABC - train tickets |    |                | where "ABC" means "train tickets," "AB" means "train," "BC" means "ticket," "A" means "fire," and "B" means "vehicle."

Ideally, "ABC" (train ticket), "AB" (train), and "BC" (ticket) would be included in the chart parse, but not "A" (fire) or "B" (vehicle) since these over-split characters are unnecessary and may lead to problems when finding partitions. In other words, the intent of the "ABCD" string was likely to be "AB-CD" (where the dash separates tokens "AB" and "CD"), which means "train ticket—price," rather than "ABC-D" which means "train ticket-money," which may not even make grammatical sense.

So one rule can be that, if a single character can be grouped with one or more following characters to build a valid word (that is, a token in the dictionary), the single character should not be split out as a separate token. In the above scenario, "ABC" is present in the dictionary so "A" is not added to the chart parse, even though "A" may be in the dictionary. Similarly, "BC" is a token in the dictionary, so "B" is not split as a single-character token.

The above example also illustrates why it may not be advantageous to only retain the longest-possible tokens in the chart parse. If only the longest tokens were used, the only possible tokenization (at least from the left chart parse) would be "ABC-D," and the correct tokenization, "AB-CD" would not be possible.

Another Chart Parse Example

Consider the input query "有意见分歧" (where the Chinese characters are referred to by English letters "ABCDE" for simplicity). The possible tokens in this query are "A," "B," "C," "D," "E," "AB," "BC," and "DE."

In the following table, the second row is the minimum tokenization, which splits on each character. The third row is the reverse chart parse, while the fourth row is the forward chart parse.

| 有 | 意 | 见 | 分 | 歧 |
|----|----|----|----|----|
| A(2) | B(2) | C(2) | D(2) | E(2) |
| A(2) |  | BC(1) |  | DE(1) |
|  | AB(2) |  | C(2) | DE(1) |

Example scores for each token are shown in parenthesis.

Dynamic Programming

In FIG. 7, a partition of the chart parse is identified using dynamic programming. Dynamic programming is a technique in which complicated problems are subdivided into smaller problems that can be more readily solved. Control begins at optional 704, where duplicate tokens are removed from a combined chart parse. The combined chart parse includes entries from the forward chart parse as well as the reverse chart parse. In various implementations, while generating the reverse chart parse, the reverse chart parse entries are simply added to the forward chart parse. The data structure used to store a chart parse may automatically prevent the creation of duplicate entries and/or discard instead of adding duplicate entries.

At 708, control determines scores for each token in the chart parse. For example only, these scores may be equal to the domain-specific scores explained in FIG. 5. At 712, control initializes a position variable to zero, which corresponds to the beginning of the input string. At 716, control determines whether an entry is found in the chart parse having a start and end value both equal to zero. If so, control transfers to 720; otherwise, control transfers to 724.

A "Score" array tracks, for each position, the lowest score found in a partition from the beginning of the input string to the position. Meanwhile, a "Partition" array tracks, for each position, the partition of tokens resulting in that lowest score.

At 720, a one-character entry has been found where the position of the character was at the beginning of the input string. The Score for position zero is set equal to the score of the found entry in the chart parse. The Partition corresponding to position zero is set equal to the token at the zero location of the input string.

At 724, no one-character token corresponding to the beginning of the input string was present in the chart parse. Because a valid partition cannot include this character alone, control sets the Score for position zero to be a maximum score value. For example, the maximum score value may be equal to the length of the input string multiplied by the maximum token length. As a placeholder, the Partition at position zero may be set equal to an empty string. Control then continues at 728.

At 728, control increments the position variable. At 732, control determines whether the position variable is past the end of the input string. If so, partitioning is compete and control returns to FIG. 5. Otherwise, control continues at 736. At 736, control determines whether an entry can be found in the chart parse with an end value equal to the position variable. If so, control transfers to 740; otherwise, control transfers to 744.

At 740, an entry having a start parameter and an end parameter, where the end parameter is equal to the position variable, was found in the chart parse. This is referred to as the found entry. The Score for the current position is therefore set equal to the sum of (i) the Score for the partition prior to the found entry and (ii) the score for the found entry itself.

In other words, the Score for the present position is equal to the sum of (i) the Score for the difference between the position variable and the length of the found entry and (ii) the score of the found entry. The length of the found entry may be calculated by subtracting the start parameter from the end parameter and adding one. The Partition for the present position is set equal to a combination of the prior Partition and the token indicated by the found entry.

For example only, the Partition may be constructed as a string with delimiters in between each token, or as a set or array of strings. For example only, the delimiter may be a predetermined Unicode character such as a predetermined punctuation character. In various implementations, the Partition may be equal to a string formed by concatenating each of the tokens with each other, each separated by the delimiter. Control then continues at 748.

At 748, control determines whether an additional entry is present in the chart parse, where the end parameter of the entry is equal to the position variable. If so, control transfers to 752; otherwise, control returns to 728. At 752, control determines whether the resulting score from the additional entry is better (less) than the existing candidate score. If so, control transfers to 740, where the Score and Partition are updated. Otherwise, control returns to 748 to see if there is yet another entry found in the chart parse.

At 744, no entry was found in the chart parse for which the end parameter of the entry is equal to the present position. Therefore, the score for the present position is set equal to the maximum score and the partition for the present position is set equal to the empty string. Control string then continues at 748.

In other implementations than what is depicted, a dynamic programming analysis may traverse the position variable from the end of the input string to the beginning of the input string. In such implementations, each candidate token under evaluation starts at the current position and ends toward the end of the input string. This is in contrast to what is depicted in FIG. 7, where each candidate token ends at the current position but starts toward the beginning of the input string.

For example, a dynamic programming analysis similar to that of FIG. 7 may be performed on the forward chart parse, while the dynamic programming analysis using the reverse traversal may be performed on the reverse chart parse. The partition having the lower score from the two approaches can be selected.

Dynamic Programming Example

The left chart parse for example input string "他说的确实在理" is shown below, where the Chinese characters are represented for simplicity by English letters:

| 他 | 说 | 的 | 确 | 实 | 在 | 理 |
|----|----|----|----|----|----|----|
|    | B(2) |    | DE(1) |    | FG(2) |    |
| AB(4) |  | CD(2) |  | EF(2) |  | G(2) |
| 0 | 1 | 2 | 3 | 4 | 5 | 6 |

The indices (0-6) are in the bottom row. The optimal partition by each index is as follows:
opt(0)=" ", score=MAX_SCORE,
opt(1)="AB", score=4,
opt(2)=" ", score=MAX_SCORE,
opt(3)="AB, CD", score=6,
opt(4)=" ", score=MAX_SCORE,
opt(5)="AB, CD, EF", score=8,
opt(6)="AB, CD, EF, G", score=10

Note that MAX_SCORE may be calculated by multiplying a MAX_TOKEN_SCORE (for example, the highest token score in the chart parse or in the entire dictionary) by the number of characters in the input string.

When the position of token G (position 6) is considered as an example, there are two tokens, FG and G, that end at that position. The minimum (best) score will therefore be:

MIN[score(FG)+opt(4),score(G)+opt(5)]=MIN[2+MAX_SCORE,2+8]=10

The optimum partition at opt(6), and therefore the optimum partition of the entire input string, will be "AB, CD, EF, G" with a score of 10.

The right chart parse for the same input query "他说的确实在理" is shown here:

| 他 | 说 | 的 | 确 | 实 | 在 | 理 |
|----|----|----|----|----|----|----|
|    | AB(4) |  | C(2) |  | DE(1) |  | FG(2) |
| A(2) |  | CD(2) |  | EF(2) |  |  |

Using a similar process, though proceeding in the opposite direction (beginning with position 6 and moving toward position 0), the optimum partition will be "AB, C, DE, FG", with a score of 9. Because this score is lower than the tokenization determined by the left chart parse dynamic programming, the tokenization "AB, C, DE, FG" will be chosen.

Example Data

As an example of the potential efficiency of an implementation of the present disclosure, a 2.31 gigabyte (GB) data file was processed. The 2.31 GB data file was stored within files according to the AVRO format in 31 different batches and compressed using GZ. In one example, the total average memory usage was 785 megabytes (MB), including 126 MB memory for an application implementing a method according to the present disclosure and 659 MB for loading the dictionaries.

The time elapsed in processing this data was 1 hour 12 minutes, while a prior art tokenizer of unknown structure required 1 hour 41 minutes. This is a 29% reduction in time (and therefore, computing power). Further, a Discounted Cumulative Gain (DCG) score of the tokenization exhibited a 1.6% gain over the DCG score measured for the prior art analyzer.

The textual data was encoded in UTF-8. As a rough estimate, the number of characters in the 2.31 GB file is 12,579,919,226. Dividing that by 4,320 seconds (the number of seconds in 1 hour and 12 minutes) results in a rate of approximately 2.91 million characters per second. However, this example is dependent on network latency and complexity of generating indices, so further enhancement may be possible.

Depending on the design constraints of a system developer, a tokenizer according to the present disclosure may be used even when the DCG score is not as favorable or when the processing time is greater than an alternative. For example, the present approach may be preferred for code complexity or maintainability reasons.

Figure 8:
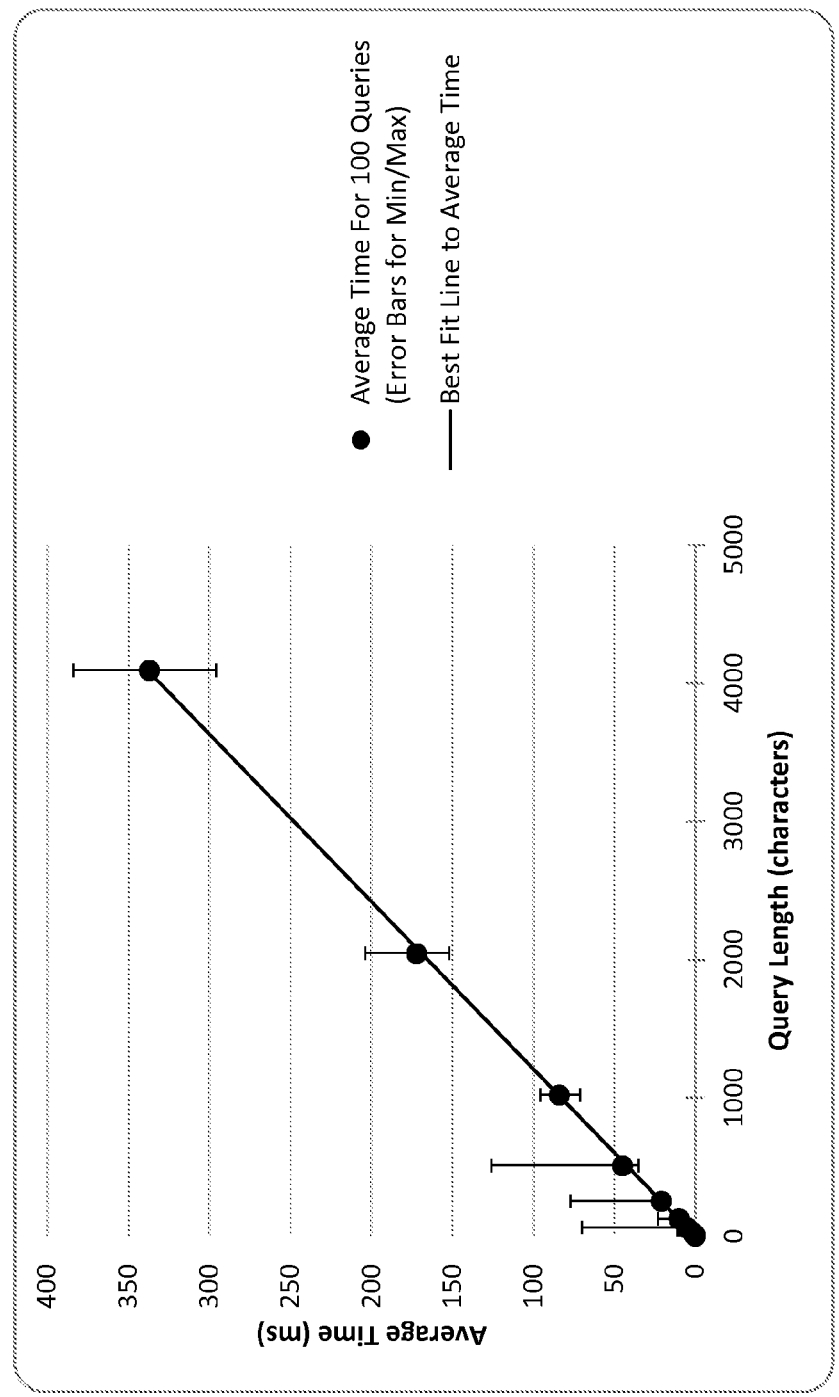
FIG. 8 is a graphical plot of performance data measured from an example implementation of query tokenization according to the principles of the present disclosure.

In FIG. 8, example test data for queries of different lengths is shown. The average (over 100 queries) time in milliseconds for queries of a certain length to be tokenized is shown with a large dot, while the shortest and longest times for a given query length are shown above and below the dot with error bars. The tested query lengths (in number of Chinese characters) are powers of two: 2, 4, 8, 16, 32, 64, 128, 256, 512, 1024, 2048, and 4096. For the 4096-character input (more than a typical page of Chinese text), the average time to tokenize the input is 337 ms, a significant improvement over the prior art.

In addition, a best fit line is shown, the best fit line minimizing the error between the line and each of the average values. The plot is shown with a linear time y-axis as well as a linear query length x-axis, and the best fit line tracks the average values quite closely. This indicates that the present disclosure may be able to achieve linear growth with increasing query length, another substantial advantage over the prior art.

Overall

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A computerized system for transforming an input text string, the input text string being an ordered set of characters, the system comprising:
   a dictionary data store configured to store a plurality of tokens, wherein each token is associated with a score, and wherein each token is a string of one or more characters;
   a chart parser configured to generate a chart parse of the input text string, wherein:
   the chart parse includes a plurality of entries,
   each entry includes (i) an indication of a start character of the entry within the input text string and (ii) an indication of an end character of the entry within the input text string, and
   the chart parser is configured to, for each position within the input text string, (i) identify a string of at least one consecutive character in the input text string that begins at that position and matches one of the plurality of tokens and (ii) unless the identified string is a single character matching the start character for another entry in the chart parse, create an entry corresponding to the identified string;

a partition selection module configured to determine a selected partition of the input text string based on the entries of the chart parse, wherein:

the selected partition includes an array of tokens such that a concatenation of the array of tokens matches the ordered set of characters of the input text string, each of the array of tokens is selected from the chart parse, a score of the selected partition is based on a sum of, for each token of the array of tokens, the score specified by the dictionary data store, and the selected partition is a minimum score partition;

a data store storing application state records;

a set generation module configured to, in response to a set of tokens, select records from the data store to form a consideration set of records; and a results generation module configured to respond to the user device with a subset of the consideration set of records, wherein the subset identifies application states of applications that are relevant to a search query from the user device, wherein the input text string is based on the search query from the user device.

2. The system of claim 1 wherein the chart parser is configured to, for each position within the input text string, (i) identify a string of consecutive characters in the input text string that ends at that position and matches one of the plurality of tokens and (ii) unless the identified string is a single character matching the end character for another entry in the chart parse, create an entry corresponding to the identified string.

3. The system of claim 1 wherein, for each entry, the indication of the start character of the entry within the input text string and the indication of the end character of the entry within the input text string are specified as one of:

a numerical start position within the input text string and a numerical end position within the input text string;

the numerical start position within the input text string and a numerical length; and the numerical length and the numerical end position within the input text string.

4. The system of claim 1 further comprising a hash map configured to store hash values of the set of tokens from the dictionary data store, wherein:

the chart parser is configured to calculate a hash value of a candidate token from the input text string; and presence of the calculated hash value in the hash map indicates that the candidate token matches one of the set of tokens.

5. The system of claim 4 wherein the set of tokens is a proper subset of the plurality of tokens in the dictionary data store, and wherein the set of tokens is selected from the plurality of tokens based on a domain of the input text string.

6. The system of claim 5 wherein the scores associated with the set of tokens are dependent on the domain.

7. The system of claim 1 wherein the chart parser is configured to generate a second chart parse by, for each position within the input text string, (i) identify a string of consecutive characters in the input text string that ends at that position and matches one of the plurality of tokens and (ii) unless the identified string is a single character matching the end character for another entry in the second chart parse, create an entry in the second chart parse corresponding to the identified string.

8. The system of claim 7 wherein the partition selection module is configured to:

determine a first partition of the input text string having a first score using the entries of the chart parse;

determine a second partition of the input text string having a second score using the entries of the second chart parse;

designate the first partition as the selected partition in response to the first score being lower than the second score; and designate the second partition as the selected partition in response to the second score being lower than the first score.

9. The system of claim 1 wherein the score of the selected partition is equal to the sum of, for each token of the array of tokens, the score specified by the dictionary data store.

10. The system of claim 1 wherein, for each token in the dictionary data store, the associated score is based on frequency of occurrence of the token.

11. The system of claim 10 wherein, for each token in the dictionary data store, the associated score is calculated by taking an inverse logarithm of the frequency of occurrence of the token.

12. A search system comprising:

the system of claim 1; and a set processing module configured to assign a score to each record of the consideration set of records, wherein the subset is selected based on the assigned scores.

13. A search system comprising:

the system of claim 1;

an intake module configured to generate the application state records from source data, wherein the source data includes a text string used as the input text string; and a set processing module configured to assign a score to each record of the consideration set of records.

14. A computerized method for transforming an input text string, the input text string being an ordered set of characters, the method comprising:

storing a plurality of tokens in a dictionary data store, wherein each token is associated with a score, and wherein each token is a string of one or more characters;

generating a chart parse of the input text string, wherein:

the chart parse includes a plurality of entries;

each entry includes (i) an indication of a start character of the entry within the input text string and (ii) an indication of an end character of the entry within the input text strings, and generating the chart parse includes, for each position within the input text string, (i) identifying a string of at least one consecutive character in the input text string that begins at that position and matches one of the plurality of tokens and (ii) unless the identified string is a single character matching the start character for another entry in the chart parse, creating an entry corresponding to the identified string;

determining a selected partition of the input text string based on the entries of the chart parse, wherein:

the selected partition includes an array of tokens such that a concatenation of the array of tokens matches the ordered set of characters of the input text string, each of the array of tokens is selected from the chart parse, a score of the selected partition is based on a sum of, for each token of the array of tokens, the score specified by the dictionary data store, and the selected partition is a minimum score partition;

in response to a set of tokens, selecting records from a data store storing application records to form a consideration set of records;

assigning a score to each record of the consideration set of records; and responding to the user device with a subset of the consideration set of records, wherein the subset is selected based on the assigned scores, and wherein the subset identifies application states of applications that are relevant to a search query from the user device, wherein the input text string is based on the search query from the user device.

15. The method of claim 14 wherein generating the chart parse further includes, for each position within the input text string, (i) identifying a string of consecutive characters in the input text string that ends at that position and matches one of the plurality of tokens and (ii) unless the identified string is a single character matching the end character for another entry in the chart parse, creating an entry corresponding to the identified string.

16. The method of claim 14 wherein, for each entry, the indication of the start character of the entry within the input text string and the indication of the end character of the entry within the input text string are specified as one of:

a numerical start position within the input text string and a numerical end position within the input text string;

the numerical start position within the input text string and a numerical length; and the numerical length and the numerical end position within the input text string.

17. The method of claim 14 further comprising:

creating a hash map that stores hash values of the set of tokens from the dictionary data store; and calculating a hash value of a candidate token from the input text string, wherein presence of the calculated hash value in the hash map indicates that the candidate token matches one of the set of tokens.

18. The method of claim 17 wherein:

the set of tokens is a proper subset of the plurality of tokens in the dictionary data store; and the method further comprises selecting the set of tokens from the plurality of tokens based on a domain of the input text string.

19. The method of claim 18 wherein the scores associated with the set of tokens are dependent on the domain.

20. The method of claim 14 further comprising generating a second chart parse by, for each position within the input text string, (i) identifying a string of consecutive characters in the input text string that ends at that position and matches one of the plurality of tokens and (ii) unless the identified string is a single character matching the end character for another entry in the second chart parse, creating an entry in the second chart parse corresponding to the identified string.

21. The method of claim 20 further comprising:

determining a first partition of the input text string having a first score using the entries of the chart parse;

determining a second partition of the input text string having a second score using the entries of the second chart parse;

designating the first partition as the selected partition in response to the first score being lower than the second score; and designating the second partition as the selected partition in response to the second score being lower than the first score.

22. The method of claim 14 wherein the score of the selected partition is equal to the sum of, for each token of the array of tokens, the score specified by the dictionary data store.

23. The method of claim 14 wherein, for each token in the dictionary data store, the associated score is based on frequency of occurrence of the token.

24. The method of claim 23 further comprising, for each token in the dictionary data store, calculating the associated score by taking an inverse logarithm of the frequency of occurrence of the token.

* * * * *